J. F. NEWSOM.
AUTOMATICALLY CONTROLLED ELECTRIC COFFEE COOKER.
APPLICATION FILED MAY 29, 1916.
1,318,168.
Patented Oct. 7, 1919.
3 SHEETS—SHEET 2.
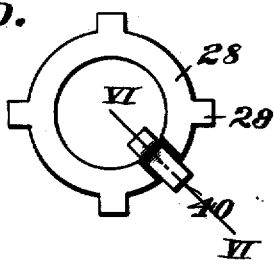
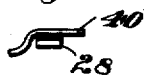
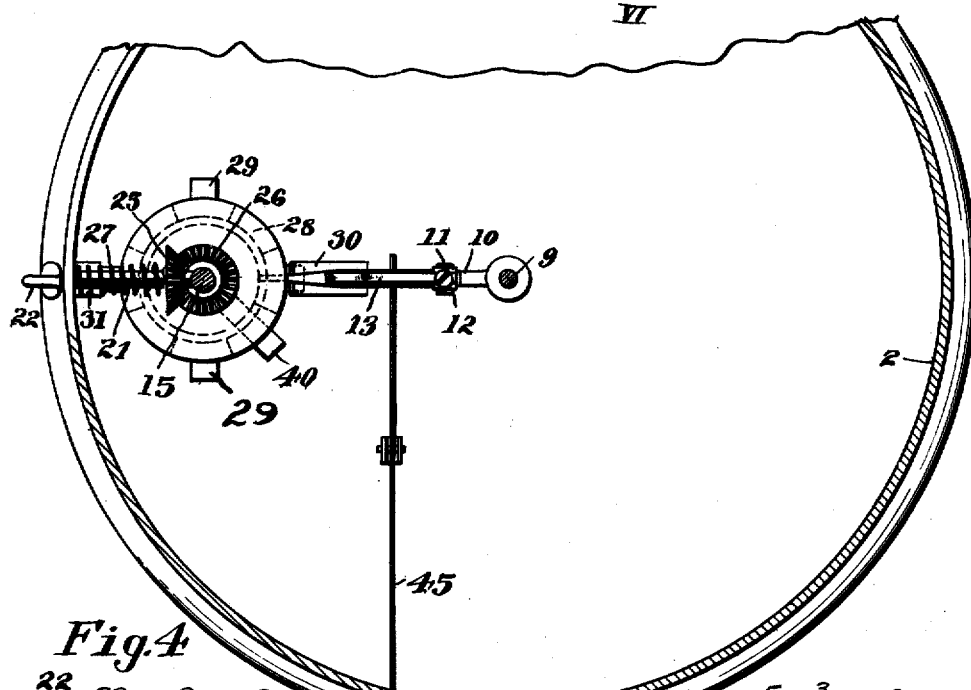
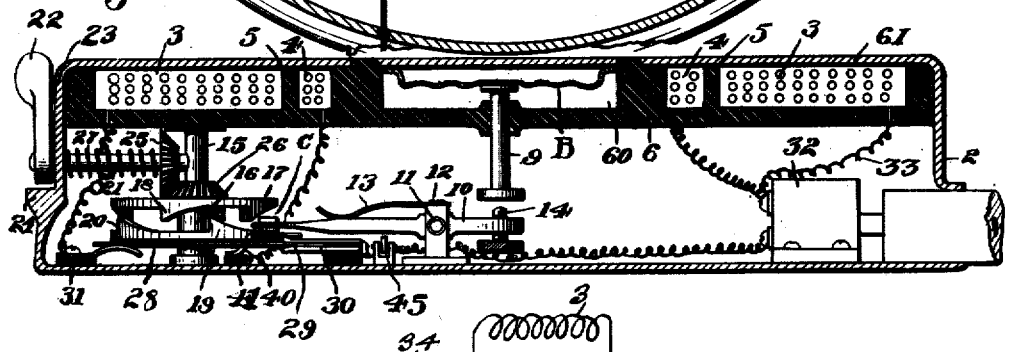
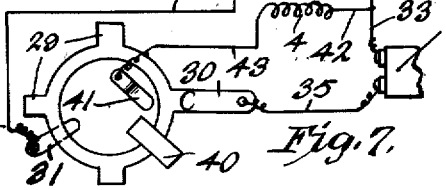
INVENTOR
John F. Newsom
WITNESSES:
B. R. Abbott
ATTORNEYS

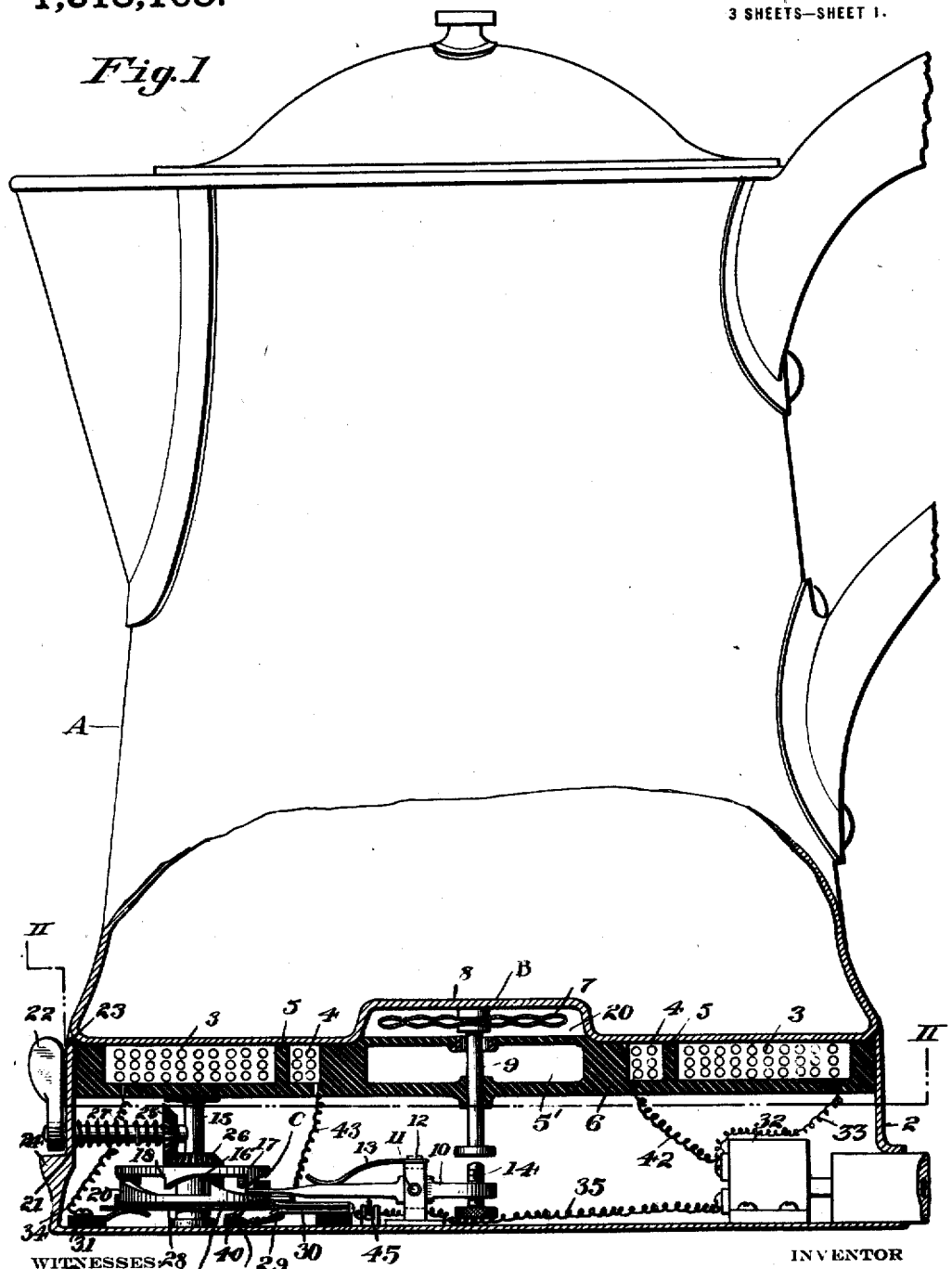

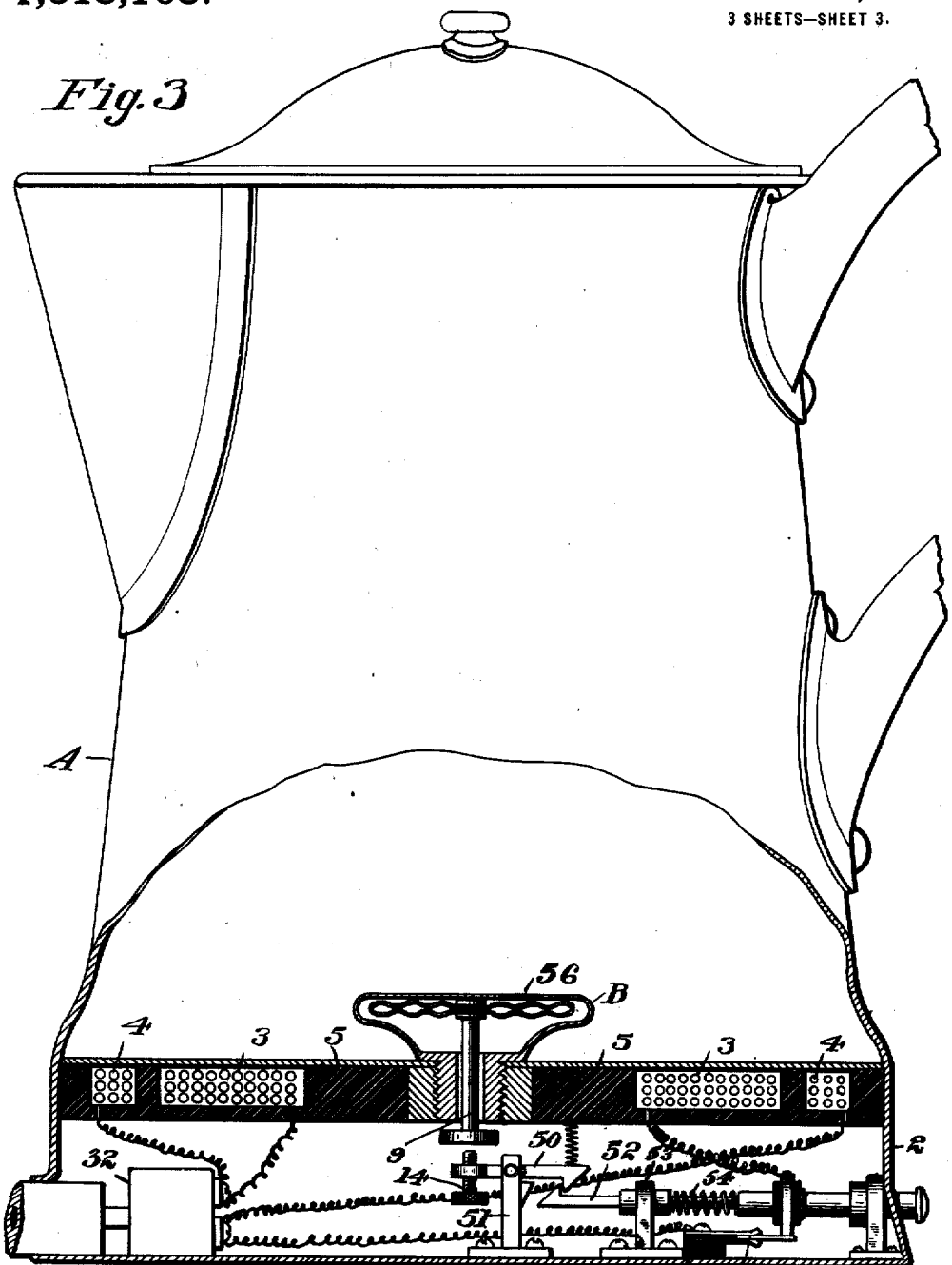

UNITED STATES PATENT OFFICE.

JOHN F. NEWSOM, OF PALO ALTO, CALIFORNIA.

AUTOMATICALLY-CONTROLLED ELECTRIC COFFEE-COOKER.

1,318,168. Specification of Letters Patent. Patented Oct. 7, 1919.

Application filed May 29, 1916. Serial No. 100,528.

*To all whom it may concern:*

Be it known that I, JOHN F. NEWSOM, a citizen of the United States, residing at the city of Palo Alto, county of Santa Clara, and State of California, have invented new and useful Improvements in Automatically-Controlled Electric Coffee-Cookers, of which the following is a specification.

This invention relates to an automatically controlled electric coffee cooker, and particularly to improvements on my co-pending application entitled "Electric coffee cooker," filed February 7, 1916, Serial Number 76,586.

An object of the present invention is to provide a simple, cheaply manufactured, economic electric cooker provided with means for regulating the time of cooking coffee, or other beverages and foods, and particularly to provide a thermostatic switch control adapted to be actuated by the temperature obtained within the cooking receptacle, or other object heated, to intermittently or permanently break the electric circuit through the heating elements when predetermined temperatures are reached within the cooker. Further objects will hereinafter appear.

The invention consists of the parts and the construction and combination of parts as hereinafter more fully described and claimed, having reference to the accompanying drawings, in which—

Figure 1 is a central, vertical section through the cooker.

Fig. 2 is a plan view on line II—II of Fig. 1.

Fig. 3 is a view similar to Fig. 1, showing a modification of the automatic switch.

Fig. 4 is another view similar to Fig. 1, showing the cooker removed.

Fig. 5 is a plan view of the switch member 28.

Fig. 6 is a section taken on the line VI—VI of Fig. 5.

Fig. 7 is a diagrammatic view, showing the wiring diagram employed.

Referring to the drawings in detail, A indicates the coffee pot proper and 2 the base upon which it is mounted. Any suitable shape may be given to the pot, which will hereinafter be termed a "receptacle," but the preferable shape is here shown. The receptacle is heated by a main heating element 3 and an auxiliary element 4. These elements are mounted in the upper portion of the base and are suitably insulated from each other and the base by means of a heat-insulating material 5. The main novelty in the present invention resides in the provision of the thermostat, generally indicated at B, and the automatic switch, generally indicated at C; the thermostat, together with the switch mechanism shown, being provided for the purpose of intermittently or permanently breaking the electric circuit through the heating elements when predetermined temperatures are reached within the cooker, as will hereinafter be described.

By referring to Fig. 1, it will be seen that the thermostat is mounted within a chamber 20 and that this chamber is insulated from the radiating heat of the elements 3 and 4 by means of a lower air chamber 5' and an annular heat-insulating ring 6. The thermostat thus insulated is, practically speaking, only affected by the temperature obtained within the receptacle. The thermostat B is, in this instance, constructed on the thermopile principle and may consist of one or more disks 7 of the character here shown. The disk shown is secured to a raised portion 8, formed in the bottom of the receptacle, and attached to said disk is a downwardly projecting rod 9 which is provided for the purpose of actuating a lever 10, pivotally mounted, as at 11, in a standard 12, secured in the bottom of the base section.

The lever proper is normally held in the position shown in Fig. 1 by means of a spring 13, and its position is changed only when the thermostat expands and the rod 9 engages with an adjusting screw 14 secured in the end of the lever.

Mounted beyond the outer end of the arm 10 is a standard 15, upon which is turnably mounted a sleeve 16. Mounted on one end of the sleeve is an upper disk 17, provided with a plurality of downwardly projecting cam members 18, and secured near the lower end of the sleeve is a similar disk 19 provided with a plurality of upwardly projecting cam members 20. The diameter of the disks 17 and 19 and the position of the cams 18 and 20 are such that engagement will be made with the outer end of the arm 10, as will hereinafter be described.

Journaled at one end in the standard 15 and at the opposite end in the side of the base 2, is a horizontally disposed shaft 21, on the outer end of which is secured a lever 22 movable with relation to a dial 23 and a stop lug 24. Secured on the inner end of the shaft is a bevel gear 25, and intermeshing with said gear is a horizontally positioned bevel gear 26, which is secured to the sleeve 16 to turn in unison with the cam disks 17 and 19. Surrounding the shaft 21 is a coil spring 27. One end of this spring is secured to the gear 25, while the opposite end is secured to the side of the base 2. This spring is secured in the manner shown so as to permit it to be wound when lever 22 is turned downwardly into engagement with the stop plug 32.

Secured on the lower side of the cam disk 19 is a switch member 28, which is provided with a plurality of outwardly projecting blades 29. This switch member is insulated from the cam disk 19, the sleeve 16 and the standard 15 upon which it is turnably mounted and is provided for the purpose of establishing a circuit between the knife switch, indicated at 30, and a switch member 31. One terminal of the main heating element, indicated at 3, is connected with a switch plug of suitable construction, shown at 32, by means of a wire 33, while the other terminal of the heating element is connected with a switch member 31, through a wire 34, and then by means of a wire 35 which is connected at one end to the knife switch 30 and at the opposite end to the plug 32; the switch member interposed between the wires 34 and 35 being provided for the purpose of making or breaking the circuit through the element, as will hereinafter be described.

In operation, with the receptacle A filled, it is only necessary to turn the lever 22 anti-clockwise until it engages with the stop lug 24. This causes the shaft 21 to turn and simultaneously the gears 25 and 26, with connected sleeve 16 and attached cam disks 17 and 19, together with the switch member 28. A complete turn of the lever 22 into engagement with the lug will bring the switch member 28 to a position where one of the projecting blades 29 will engage the knife switch 30, thus closing a circuit through the main heating element 3 and the plug 32.

The switch mechanism will now remain stationary and the current will continue flowing through the element 3 until the temperature of the contents within the receptacle A has reached the boiling point, or any temperature desired. The thermostat B insulated from the heating element, as previously described, gradually expands as the temperature in the receptacle rises but will not trip the lever 10 until the desired temperature is reached within the receptacle A as it is actuated entirely by this temperature.

Expansion of the thermopile 7 will cause the rod 9 to move in a downward direction and engage the set-screw 14, causing this end of the lever to become depressed and the opposite end of the lever to rise with relation to a contacting cam member 20 formed on the lower disk 19. The lever will continue rising until it moves out of engagement with this cam member and will, therefore, release both the upper and the lower disks which will now turn about the standard 15, due to the tension of the spring 27, until the succeeding cam member 18, on the upper disk, engages the outer end of the lever.

The blade projection 29, previously in engagement with the knife switch 30, is thus released and the circuit through the element is broken. The contents of the receptacle A will thus have a tendency to cool to a certain extent, thus permitting the thermopile to contract and the rod 9 to move out of engagement with the set-screw 14. The spring 13 engaging with the lever 10 has, however, sufficient tension to depress the outer end of the lever 10, thus maintaining an engagement between the set-screw 14 and the rod 9 and similarly moving the arm out of engagement with the lug 18. The coöperating disks 17 and 19 are thus again released and will turn about the standard 15 until the second cam member 20 is engaged.

In the present instance it will be seen that each disk 17 and 19 is provided with four cam members and also that the switch member 28 is provided with four projecting blades 29. These blades are mounted in alinement with the cam members 20 formed on the lower disk. It can, therefore, be seen that the circuit through the element will be closed when the lever 10 is moved into engagement with the lower cam members and that the circuit is broken when the lever is moved to engage with the upper cam members. The circuit through the heating element 3 is thus opened and closed three times after the contents of the receptacle is first brought to a boiling point and that the cam disk provided merely acts as an escapement to control the position of the switch member 28 and that the thermostat B, controlled by the temperature within the receptacle, actuates and times the movement of the escapement.

If it is desired to prevent the temperature within the receptacle from dropping too rapidly, or, in other words, prevent the contents from cooling after same has once been brought to boiling point, it is possible to employ the auxiliary heating element indicated at 4. The circuit through this element is established by providing the contact member indicated at 40. This member is carried by the lower cam disk 19, but is insulated therefrom. One end of the blade 40 is adapted to engage with a wipe contact 41, while the other end engages with the knife switch 30. One of the terminal wires of the element 4 is, therefore, connected with the plug 32 through a wire 42, while the other terminal is connected through another wire 43 with the wipe contact 41, which in turn establishes a circuit through the wire 35 and plug 32, when the blade 40 moves into position, as shown in Fig. 1; this position being assumed when the cam disks have returned to normal position, or, in other words, when the lever 22 has returned to zero position as far as the indicator is concerned. Any desired temperature, as far as the contents of the receptacle is concerned, may thus be maintained indefinitely or until the circuit is finally broken by removing the plug 32.

By referring to Figs. 1 and 2, it will be seen that a trip lever 45 has been provided. One end of this lever extends through the base while the other end engages with the lower side of the arm 10. This trip lever is provided for the purpose of raising and lowering the arm 10, or, in other words, to operate the escapement if it is desired to return it to raised position without relying upon the normal action of the thermopile 7.

By referring to Fig. 3, which, in principle, is the same as the mechanism just described, it will be seen that the circuit through the heating element is permanently broken when the boiling point or any predetermined point is reached within the receptacle. The switch mechanism actuated by the thermostat consists of an arm 50 pivotally mounted in the standard 51. This arm is actuated by the thermostat in a manner similar to the arm 10 described in connection with Figs. 1 and 2. The outer end of the arm 50 is in this instance provided with a hook-shaped extension which is adapted to engage with a similarly shaped extension formed on the sliding bar 52 carried by the standards 53. The sliding bar is normally held out of engagement with the arm 50 by the tension of a spring 54, thus maintaining the members of the knife switch, indicated at 55, out of engagement and breaking the circuit through the heating element.

In connection with the switch arrangement here shown it will be seen that the thermostat is inclosed by a chamber or box 56 which projects a considerable distance up within the receptacle. This is of importance as it positively prevents the thermostat from being actuated by the heat of the elements.

The illustration shown in Fig. 4 is practically the same as the device shown in Figs. 1 and 2, with the exception that the cooking receptacle is entirely removed. The heat insulating ring 6 is, furthermore, carried through the base, thus forming a cavity 60 for the reception of the thermostat and forming a positive insulation between the heating elements and the thermostat. Any article, such as an iron, cooking receptacle, etc., may be placed upon the annular ring plate, indicated at 61, and the final temperature to which the object is heated is radiated through the said object to affect the thermostat B.

The device shown in Fig. 4 may, in actual practice, prove the most desirable construction as it permits of a more general use than the device shown in Fig. 1 which is practically limited to the boiling of coffee or other liquid foods; while the device shown in Fig. 4 may be used for practically any purpose where heat is required. The particular form of thermostat employed in either device does not form any part of the invention as it is obvious that any suitable form may be employed which is sufficiently sensitive to be actuated by the heat obtained within the receptacle.

The device as a whole is simple and substantial in construction, may be used for general heating or cooking purposes, and is so constructed that the circuit through the heating element may either be permanently broken when a predetermined temperature is secured or may be intermittently broken any desired number of times after a predetermined temperature has first been reached. This can easily be understood by referring to either Figs. 1 or 4, as it is possible to employ any number of projecting cam members, thus making it possible to make or break the circuit as many times as desired.

The materials and finish of the several parts of the device are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. In a cooker, a receptacle, means for heating the contents of the receptacle until a predetermined temperature is obtained, and means actuated by said temperature for turning off and on the heat a predetermined number of times.

2. In a cooker, a receptacle, means for heating the contents of the receptacle until a predetermined temperature is obtained, and means for intermittently turning off and on the heat a predetermined number of times after a predetermined temperature is obtained within the receptacle.

3. In a cooker, a receptacle, an electric heating element adapted to heat the receptacle, a switch adapted to intermittently open and close a circuit through the heating element, and a thermostat actuated by the temperature within the receptacle adapted to intermittently operate the switch to open and close the circuit through the heating element a predetermined number of times.

4. The combination with an electrically heated fluid receptacle, of a thermostatic means to actuate an intermittent circuit control mechanism when the boiling temperature has been reached by the contents of the receptacle and before appreciable evaporation has occurred, said thermostatic means being actuated by the temperature of the contents of the receptacle and independent of the temperature of the heating element.

5. In a cooker, a receptacle, an electric heating element adapted to heat the receptacle, a revolving switch member adapted to intermittently close and open a circuit through the heating element, and a thermostat adapted to control the revolving movement of the switch.

6. In a cooker, a receptacle, an electric heating element adapted to heat the receptacle, a revolving switch member adapted to intermittently close and open a circuit through the heating element, an escapement mechanism connected with the switch to cause a step by step rotation of the switch, and a thermostat controlling the movement of the escapement.

7. In a cooker, a receptacle, an electric heating element adapted to heat the receptacle, a revolving switch member adapted to intermittently close and open a circuit through the heating element, an escapement mechanism connected with the switch to cause a step by step rotation of the switch, and a thermostat actuated by the temperature obtained within the receptacle controlling the movement of the escapement.

8. In a cooker, an electric heater comprising an insulating ring, and a heating element mounted within said ring, a cooking receptacle mounted above said ring and adapted to be heated by said heating element, said insulating ring being provided with an air chamber, a thermostat mounted above said air chamber and insulated thereby from the heat of said heating element, and a switch controlled by said thermostat under the influence of the heat in said receptacle.

9. In a cooker, an electric heater comprising a main heating element and an auxiliary heating element, a switch adapted to close a circuit through said heating elements, thermostatic means controlled by the heat generated by said heating elements for permitting the operation of said switch to make and break the circuit of said main heating element a predetermined number of times, and means carried by said switch for closing a circuit through the auxiliary heating element when the circuit through the main heating element has been broken a predetermined number of times.

In testimony whereof I have hereunto set my hand in the presence of two subscribing witnesses.

JOHN F. NEWSOM.

Witnesses:
 W. W. HEALEY,
 THOS. CASTBERG.